United States Patent
Elhachimi et al.

(10) Patent No.: US 9,232,153 B2
(45) Date of Patent: Jan. 5, 2016

(54) FLICKER COMPENSATION METHOD USING TWO FRAMES

(71) Applicant: STMICROELECTRONICS (GRENOBLE 2) SAS, Grenoble (FR)

(72) Inventors: Mhamed Elhachimi, Grenoble (FR); Arnaud Deleule, Grenoble (FR); Adrien Martin, Grenoble (FR)

(73) Assignee: STMICROELECTRONICS (GRENOBLE 2) SAS, Grenoble (FR)

(*) Notice: Subject to any disclaimer, the term of this patent is extended or adjusted under 35 U.S.C. 154(b) by 0 days.

(21) Appl. No.: 14/512,652

(22) Filed: Oct. 13, 2014

(65) Prior Publication Data
US 2015/0103209 A1    Apr. 16, 2015

(30) Foreign Application Priority Data
Oct. 14, 2013 (FR) .................... 13 59963

(51) Int. Cl.
| | |
|---|---|
| *H04N 5/235* | (2006.01) |
| *H04N 5/265* | (2006.01) |
| *H04N 5/355* | (2011.01) |
| *H04N 5/353* | (2011.01) |

(52) U.S. Cl.
CPC ........... *H04N 5/2357* (2013.01); *H04N 5/2356* (2013.01); *H04N 5/265* (2013.01); *H04N 5/3532* (2013.01); *H04N 5/35536* (2013.01)

(58) Field of Classification Search
CPC ... H04N 5/2357; H04N 5/265; H04N 5/2356; H04N 5/35536; H04N 5/3532
See application file for complete search history.

(56) References Cited

U.S. PATENT DOCUMENTS

| | | | |
|---|---|---|---|
| 8,253,090 B2 | 8/2012 | Barbier et al. | |
| 2004/0001153 A1* | 1/2004 | Kikukawa | H04N 5/235 348/226.1 |
| 2007/0046790 A1 | 3/2007 | Nakasuji et al. | |
| 2008/0101721 A1 | 5/2008 | Mori | |
| 2009/0167894 A1* | 7/2009 | Nakaoka | H04N 5/2357 348/226.1 |
| 2012/0194698 A1 | 8/2012 | Cami | |
| 2012/0206640 A1* | 8/2012 | Nakagawara | H04N 5/23212 348/345 |
| 2013/0242143 A1* | 9/2013 | Chen | H04N 5/2357 348/241 |

* cited by examiner

*Primary Examiner* — Jason Flohre
(74) *Attorney, Agent, or Firm* — Allen, Dyer, Doppelt, Milbrath & Gilchrist, P.A.

(57) ABSTRACT

A flicker compensation method for images taken by an image sensor operating in rolling-shutter mode may include capturing a first image and capturing a second image offset in time from the first image by an integer or zero number of flicker periods, plus half a flicker period. The method may also include producing a compensated image based on an average of the first and second images.

8 Claims, 2 Drawing Sheets

FLICKER COMPENSATION METHOD USING TWO FRAMES

FIELD

The invention relates to picture sensor arrays, especially sensors operating on the principle of an electronic rolling shutter that may be sensitive to a flicker phenomenon.

BACKGROUND

Some types of light sources that operate by line power and that illuminate a scene produce a brightness that varies sinusoidally according to the square of the line voltage. Thus, these light sources flicker at twice the frequency of the line power. Halogen and incandescent lamps are typical examples.

Usually, the brightness of scenes illuminated by such sources is low, and photography typically requires relatively long exposure times, exceeding the flicker period. Under these conditions, the images shot with an electronic rolling shutter sensor reveal few visual artifacts. To reduce any artifact in these conditions, some sensors are programmed so that the exposure time is a multiple of the flicker period.

FIGS. 1a and 1b show a high brightness situation under illumination by a flickering source, whereby an exposure time smaller than the flicker period may be desirable. A similar situation may occur when the sensor is very sensitive. The brightness P is shown in the upper part of the figure by a sinusoid of period Tf.

In a rolling shutter array sensor, the rolling shutter effect is obtained by the fact that the pixels of the array are operated one row after the other. Thus, the exposure interval of each row is offset relative to the exposure interval of the previous row, by a time equal to the scan period Tr of the array, or frame period, divided by the number of rows of the array.

FIG. 1a shows an example of succession of exposure intervals for four consecutive rows R1 to R4. The intervals are of a same duration and offset with respect to each other by a period Tr. In each interval, a different portion of a period of the sinusoid representing the brightness is integrated. The result is that successive rows integrate different levels of brightness.

FIG. 1b illustrates a portion of an image rendered in this situation for a uniform gray scene. The rendered image, whereas it should be uniform, includes alternating dark and light bands whose number is equal to the ratio between the frame period and the flicker period.

Some rolling shutter image sensors, such as disclosed in U.S. Pat. No. 8,253,090, are capable of multiple integrations (or exposures) per frame. This type of sensor is used, for example, to produce several versions of the same image with different exposure levels. These versions can then be combined to produce a high dynamic range or HDR image.

FIG. 2 illustrates an exemplary operation of a sensor having three integration intervals used in a high brightness environment under flickering light. A same row is subjected to three consecutive integrations, the first over a short time interval Tia, the second over a medium time interval Tib, for example the double of interval Tia, and the third over a long time interval Tic, for example four times longer than interval Tia. This produces three images, respectively dark, medium, and bright. The rows of values obtained at the end of the integration intervals are combined to produce the HDR image.

The values may be combined in different known manners, for example using an algorithm designed to bring out detail in overexposed areas and underexposed areas. For this purpose, the algorithm may analyze each pixel of the medium image, and replace it with a weighted pixel of the bright image or of the dark image, depending on whether the analyzed pixel has a brightness level below a dark threshold or above a bright threshold.

In the presence of bright flickering light, the integration intervals may, as shown, be shorter than the flicker period. In this case, a situation similar to that of FIG. 1a is encountered, where the integration intervals for each row see a different portion of a period of the sinusoid representing the illumination brightness. The resulting image also has alternating light and dark bands.

SUMMARY

Thus it may be desirable to compensate the flicker effect on a rolling shutter sensor under bright light conditions, including sensors for generating HDR images.

This desire may be addressed by providing a flicker compensation method for images taken by an image sensor operating in rolling-shutter mode. The method may include the steps of capturing a first image, capturing a second image offset in time from the first image by an integer or zero number of flicker periods, plus half a flicker period, and producing a compensated image based on an average of the first and second images.

According to an embodiment, the first and second images have the same exposure time. According to an embodiment, the first and second images may have different exposure times, whereby the time offset between the first and second images is defined between the centers of the exposure times of the images, and the image associated with the shorter exposure time is weighted by the ratio between the longer exposure time and the shorter exposure time.

According to an embodiment, a multiple exposure image sensor is used for capturing the first and second images in two successive integration intervals of the sensor.

BRIEF DESCRIPTION OF DRAWINGS

FIG. 1b is a resulting visual effect of the image capture of FIG. 1a.

DESCRIPTION OF EMBODIMENTS

Figure 1A:
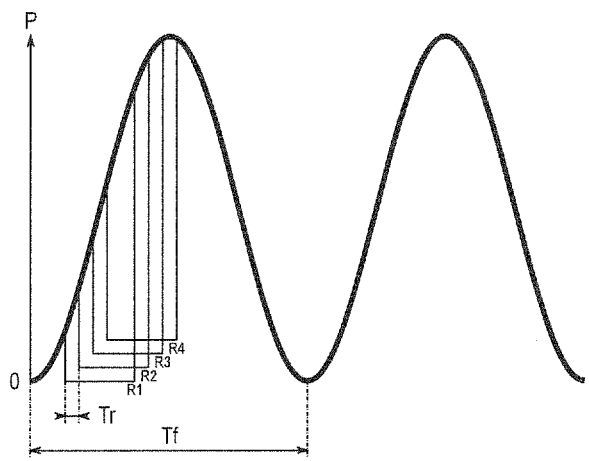
FIG. 1a is a graph illustrating an image capture in rolling shutter mode with a high brightness flickering light source according to the prior art.
Figure 1B:
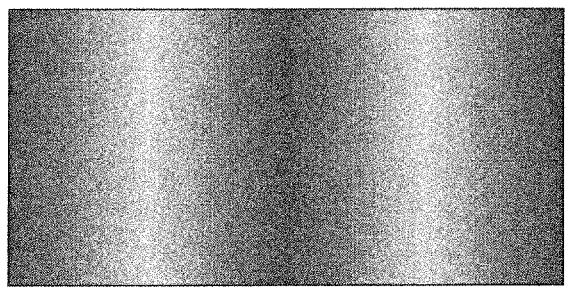
Figure 2:
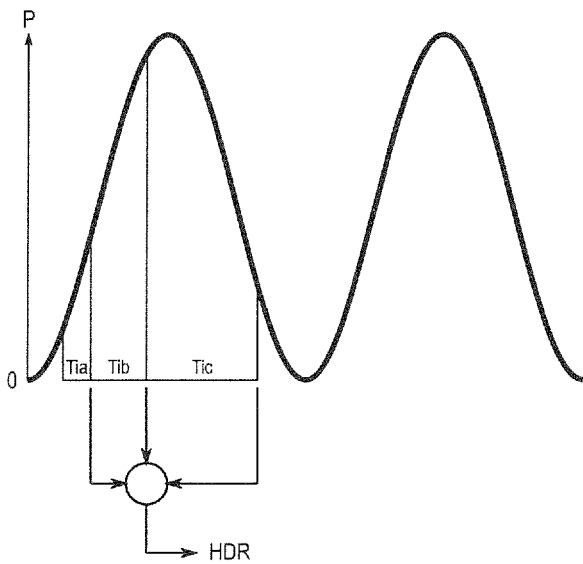
FIG. 2 is a diagram illustrating an image capture under the same conditions, using a multiple exposure sensor according to the prior art.
Figure 3:
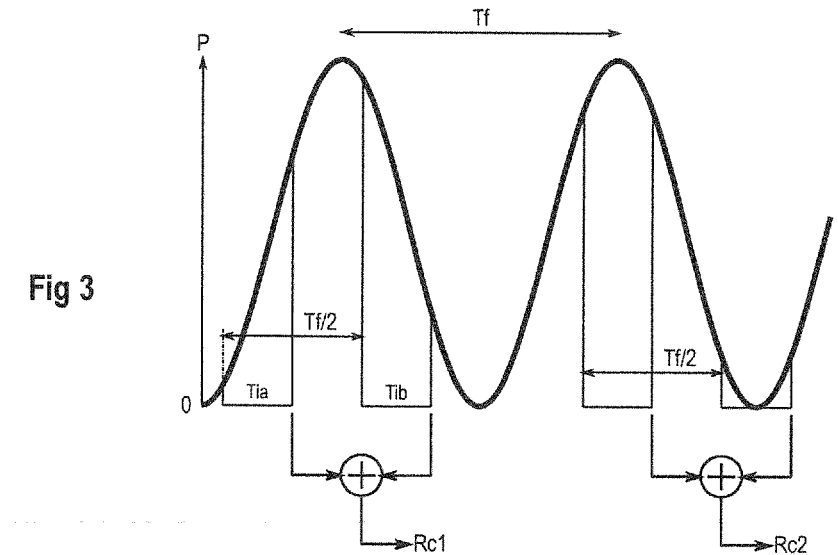
FIG. 3 is a diagram illustrating a flicker compensation technique applicable to a simple image according to an embodiment.

FIG. 3 illustrates, similar to FIGS. 1a, 1b, and 2, a situation of a scene illuminated by a high power flickering light source. The brightness P is illustrated by a sine wave of period Tf. The average brightness is such that the image sensor generally requires an exposure time less than the flicker period Tia to shoot the scene.

The image sensor is of the electronic rolling shutter type. Thus, each row of the sensor is subjected to an integration interval of duration Tia, but offset from the integration interval of the previous row. The integration interval Tia is shown for a single row. It should be noted that the length of the integration interval, usually the same for all rows of the sensor, is also the exposure time of the image.

To compensate the flicker effect, the same row is subjected to a new integration interval Tib, here having the same length as the interval Tia, but shifted by half a flicker period, Tf/2, with respect to interval Tia. Thus integrating the sinusoid over two intervals of the same length separated by a half-period produces the integral of the DC component of the sinusoid over a time Tia+Tib, which is a constant value irrespective of the position the pair of intervals along the sinusoid. FIG. 3 illustrates two examples of positions of the pair of integration intervals.

The two integration results obtained at the end of intervals Tia and Tib, respectively, are averaged to produce a row of compensated values Rc1, in which the flicker effect is completely canceled. The half-flicker period Tf/2 is 5 ms for a 50 Hz line power frequency (producing a brightness variation at 100 Hz), or 4.17 ms for a line power frequency of 60 Hz. This time is generally less than the frame period of the sensor, so the sensor in this case would be designed to shoot two images per frame. Such sensors exist in the form of multiple exposure sensors used to produce HDR images (FIG. 2). Such a sensor is normally controlled to use two quasi-contiguous integration intervals of different durations. To implement the compensation technique that has just been described, the control mode of the sensor may be modified to use two integration intervals of same duration, offset by Tf/2.

The flicker compensation technique however does not require a special sensor. It may be implemented using a simple sensor by controlling it to shoot two successive images with the same exposure time. It may be sufficient that the time offset D between the two integration intervals Tia and Tib, between the exposures of the two images, be equal to an integer number of flicker periods, plus half a flicker period. In other words: $D=(K+\frac{1}{2})Tf$, where K is an integer that may be zero.

Of course, to reduce a ghosting effect due to the fact that two images apart in time are averaged, it may be desirable to reduce or minimize the offset D, and therefore that K is zero, as shown in FIG. 3.

To cancel the flicker effect in an HDR image, the technique illustrated in FIG. 3 may be applied directly to each of the multiple intermediate images used to form the HDR image. If the HDR image is based on three intermediate images, the capture of two image triplets may be generally required.

If the sensor is not configured to capture six images per frame, a triplet of intermediate images may be captured in each of two successive frames, spaced apart in time by $(K+\frac{1}{2})Tf$. However, this approach increases the risk of ghosting.

If the sensor is able to capture four images per frame, and ghosting is to be avoided, HDR images based on only two intermediate images may be produced. The two image pairs may then be captured in the same frame. This approach may not be applicable if the sensor can only capture the number of images per frame originally designed for HDR images, for example three images.

Figure 4:
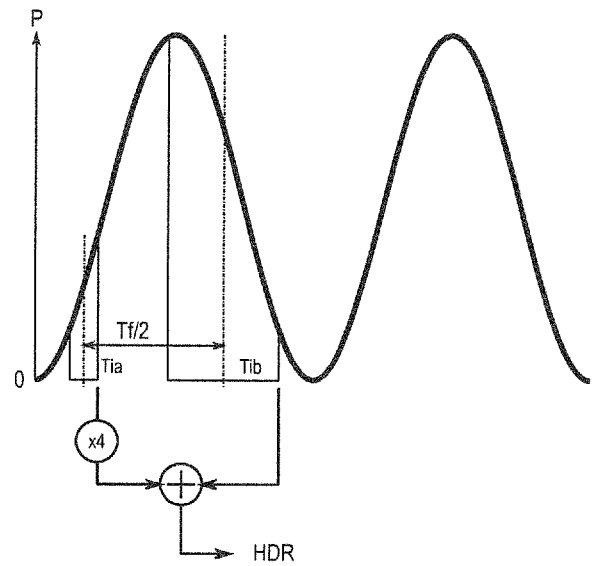
FIG. 4 is a diagram illustrating a flicker compensation technique applicable to an HDR image according to an embodiment.

FIG. 4 illustrates a compromise for this situation between the quality of the flicker compensation and the quality of the HDR images. To produce an HDR image, two intermediate images may be used having, respectively, a short exposure time Tia and a long exposure time Tib. In the example shown, Tib=4Tia. To compensate the flicker effects, the integration intervals Tia and Tib are offset for each row, as shown in FIG. 3, by a half-flicker period Tf/2.

Various definitions for the time offset between two intervals of different lengths have been explored. The best results have been obtained by measuring the offset between the centers of the intervals Tia and Tib, as shown.

The rows of values obtained after the two integration intervals undergo a weighted averaging. More specifically, the values resulting from the short interval Tia are multiplied by the ratio Tib/Tia, so 4 in the present example, and the values resulting from the long interval Tib are unchanged (multiplied by 1). The weighted values are summed to produce the values of the HDR image.

The multiplication by 4 may be carried out without information loss, i.e. by increasing the number of bits for representing the results of the multiplication. This helps maintain the detail in the bright parts of the image, which may be lost in the capture with the long exposure time Tib. The long exposure time may be selected to reveal details in the dark areas of the image.

An HDR rendering algorithm thus based on a simple weighted averaging has the advantage of being simple and produces a noticeable improvement in the image dynamic range. In addition, the algorithm offers a flicker compensation effect. By weighting by 4 (Tib/Tia) the area of the sinusoid at the short interval Tia, an approximate value is obtained for the integral of the sinusoid over a time interval 4Tia, centered on interval Tia, i.e. the situation of FIG. 3 is approached, where the compensation is nearly perfect.

The accuracy of this approximation depends on the durations of the intervals Tia and Tib and their position along the sinusoid. Bands are likely to appear on the image where the approximation is worse, but the approximation remains sufficient to significantly reduce the banding effect.

The dynamic range of the image may be improved, while compensating the flicker effect, in some cases using three integration intervals. Indeed, in many situations, the brightest image is likely to have an exposure time greater than the flicker period. The exposure time may be forced to a multiple of the flicker period to cancel or reduce the flicker effect. In this case, the previous procedure may be applied to the two darker images to produce a dark compensated intermediate image. This intermediate image may then be used with the brighter image according to a more sophisticated HDR rendering technique offering better results than a weighted average.

What is claimed is:

1. A flicker compensation method for images acquired by an image sensor operating in rolling-shutter mode, the method comprising:
   capturing a first image;
   capturing a second image offset in time from the first image by an integer or zero number of flicker periods, plus half a flicker period, the first and second images having different exposure times associated therewith, and the offset in time being between respective centers of the different exposure times;
   weighting one of the first and second images having a shorter one of the different exposure times by a ratio between a longer one of the different exposure times and the shorter one of the different exposure times; and
   producing a compensated image based on an average of the first and second images.

2. The method of claim 1, wherein the image sensor comprises a multiple exposure image sensor; and further comprising capturing the first and second images in two successive integration intervals of the multiple exposure image sensor.

3. A flicker compensation method comprising:
- capturing a first image by an image sensor operating in a rolling-shutter mode;
- capturing a second image from the image sensor, the second image being offset in time from the first image by one of an integer and zero number of flicker periods, plus a fraction of a flicker period, the first and second images having different exposure times associated therewith, and the offset in time being defined between respective centers of the different exposure times;
- weighting one of the first and second images having a shorter one of the different exposure times by a ratio between a longer one of the different exposure times and the shorter one of the different exposure times; and
- producing a compensated image based upon the first and second images.

4. The method of claim 3, wherein the image sensor comprises a multiple exposure image sensor; and further comprising capturing the first and second images in two successive integration intervals of the multiple exposure image sensor.

5. An image sensor comprising:
- image sensor circuitry; and
- flicker compensation circuitry cooperating with said image sensor circuitry to
  - acquire, in a rolling shutter mode, a first image,
  - acquire, in the rolling shutter mode, a second image offset in time from the first image by an integer or zero number of flicker periods, plus a fraction of a flicker period, the first and second images having different exposure times associated therewith, and the offset in time being defined between respective centers of the different exposure times,
  - weigh one of the first and second images having a shorter one of the different exposure times by a ratio between a longer one of the different exposure times and the shorter one of the different exposure times, and
  - generate a compensated image based upon the first and second images.

6. The image sensor of claim 5, wherein said flicker compensation circuitry cooperates with said image sensor circuitry to acquire the second image offset in time from the first image by an integer or zero number of flicker periods, plus half a flicker period.

7. The image sensor of claim 5, wherein said flicker compensation circuitry cooperates with said image sensor circuitry to generate the compensated image based upon an average of the first and second images.

8. The image sensor of claim 5, wherein the flicker compensation circuitry further cooperates with said image sensor circuitry to capture the first and second images in two successive integration intervals.

* * * * *